United States Patent
Montgomery

(10) Patent No.: US 6,441,753 B1
(45) Date of Patent: Aug. 27, 2002

(54) MULTI-FUNCTION KEY ASSEMBLY FOR AN ELECTRONIC DEVICE

(75) Inventor: Daniel Douglas Montgomery, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 69 days.

(21) Appl. No.: 09/696,615

(22) Filed: Oct. 25, 2000

(51) Int. Cl.$^7$ ................................................ H03K 17/94
(52) U.S. Cl. ............................ 341/34; 341/20; 341/24; 345/161; 200/5 A; 200/6 A; 200/6 R
(58) Field of Search ............................... 341/20, 34, 23, 341/24; 200/5 A, 6 A, 5 R, 6 R, 339; 345/160, 161

(56) References Cited

U.S. PATENT DOCUMENTS

| | | | | |
|---|---|---|---|---|
| 4,256,931 A | * | 3/1981 | Palisek | 200/5 A |
| 4,994,992 A | | 2/1991 | Lapeyre | 708/145 |
| 5,528,235 A | | 6/1996 | Lin et al. | 341/22 |
| 5,719,361 A | * | 2/1998 | Lee | 200/1 B |
| 5,783,787 A | * | 7/1998 | Data | 200/5 R |
| 5,861,823 A | * | 1/1999 | Strauch et al. | 200/5 R |
| 5,902,972 A | * | 5/1999 | Nestor et al. | 200/1 B |
| 5,949,325 A | | 9/1999 | Devolpi | 338/154 |
| 6,153,843 A | * | 11/2000 | Date et al. | 200/339 |
| 6,157,323 A | * | 12/2000 | Tso et al. | 200/5 A |
| 6,307,537 B1 | * | 10/2001 | Oowada | 345/160 |

OTHER PUBLICATIONS

U.S. patent application Ser. No. 09/389,516, filed Sep. 3, 1999, Motorola Inc.

* cited by examiner

Primary Examiner—Michael Horabik
Assistant Examiner—Albert K. Wong
(74) Attorney, Agent, or Firm—Shigeharu Furukawa

(57) ABSTRACT

An improved multi-function key assembly (12) is provided. The multi-function key assembly includes a printed circuit board substrate (28) having a popple dome switch array (26) mounted thereto. Attached to the substrate is a button member (22) adapted for use as a data input device for an electronic device. The button member has a central area or region (48) and a contoured peripheral surface (30) serving as a plurality of perimeter key regions (32–46). The contour of the peripheral surface provides a user with tactile feedback in determining the location of the various key regions. The button member additionally includes a plurality of plungers (54–68, 72) extending from its bottom surface (70). Each plunger corresponds to a specific key region and is capable of actuating a popple dome switch (154, 156) for that specific key region. The assembly may include a base (76) having a plurality of legs (90). The base can be mounted to the substrate or a housing (2) and supportably allows the button member to pivot about a central plunger (72) located on its bottom surface. The base may additionally include indentions (110) on its legs and a raised central hub (88) for providing clearance between the base and the popple dome switch array.

7 Claims, 10 Drawing Sheets

MULTI-FUNCTION KEY ASSEMBLY FOR AN ELECTRONIC DEVICE

BACKGROUND OF THE INVENTION

The present invention relates to a data input device for an electronic device and, more particularly, to an improved multi-function key assembly. The present invention finds particular application as a multi-function key assembly for a cellular telephone, and will be described with particular reference thereto. However, it will be appreciated that the present invention is also amenable to other like applications.

There is considerable consumer demand for small form factor electronic devices. There is a competing consumer demand for electronic devices that include more and more features. This competing demand generally translates into greater data processing and display capabilities, which typically requires greater real estate in the electronic device. With regard to display capabilities, it is considered desirable to provide an electronic device with as large a display screen as practical. However, increasing the size or viewable area of a display screen associated with a small form factor electronic device leaves little room for data entry from a conventional keypad matrix such as a twelve-button keypad (0–9, *, and #). It is not practical to continue reducing the size and/or the spacing of the buttons that form a conventional keypad matrix arrangement.

Accordingly, it has been considered desirable to develop a new and improved multi-function key assembly for an electronic device that meets the above-stated needs and overcomes the foregoing difficulties and others while providing better and more advantageous results.

BRIEF DESCRIPTION OF THE DRAWINGS

The structure, operation and advantages of the presently preferred embodiments of this invention will become further apparent upon consideration of the following description, taken in conjunction with the accompanying drawings. Of course, the drawings are only for purposes of illustrating preferred embodiments and are not to be construed as limiting the invention.

DETAILED DESCRIPTION OF THE INVENTION

Figure 1:
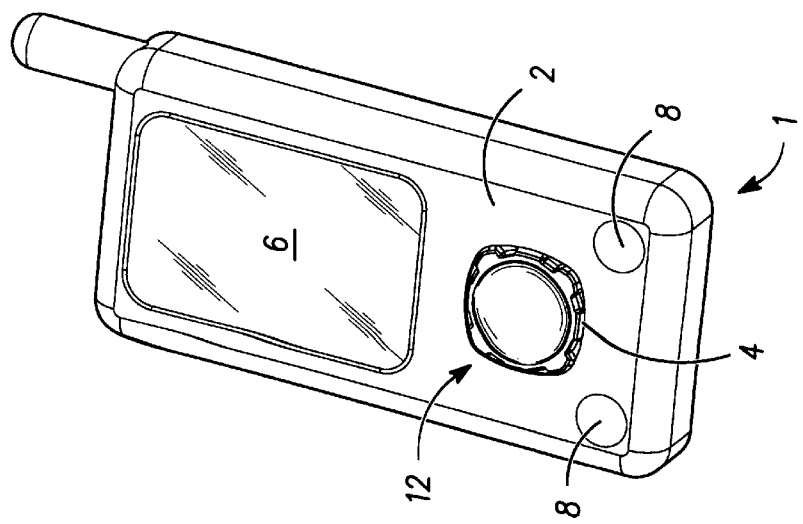
FIG. 1 is a perspective view of an exemplary electronic device having a multi-function key assembly in accordance with the present invention.

With reference now to FIG. 1, there is shown an exemplary electronic device 1. The electronic device 1 can be, without limitation, a telephone, a wireless subscriber device, a cable telephony interface device, a cellular or PCS radiotelephone, a cordless radiotelephone, a radio, a personal digital assistant (PDA), a pager, a palm-top computer, a personal computer, etc. The electronic device 1 includes a housing 2 having at least one opening 4, a display screen 6, one or more optional auxiliary buttons 8, and a multi-function key assembly 12 that incorporates the features of the present invention therein. Auxiliary buttons 8 may be representative of a zero key, a send key, a power key (e.g., on/off key), or any other functional key.

Figure 2:
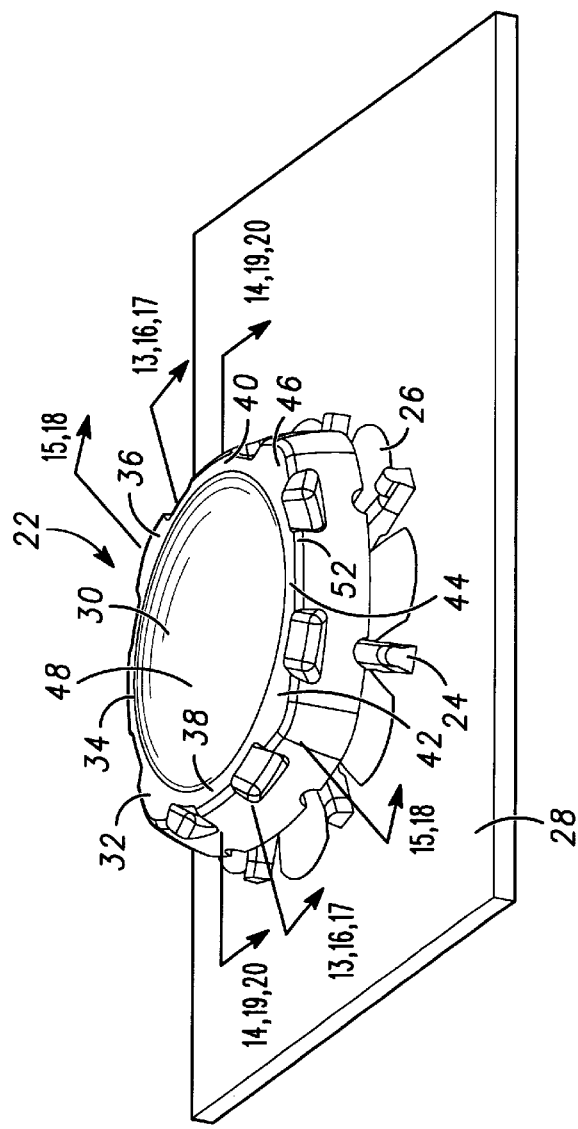
FIG. 2 is a perspective view of a key assembly in abutting contact with a substrate shown with the housing removed.
Figure 4:
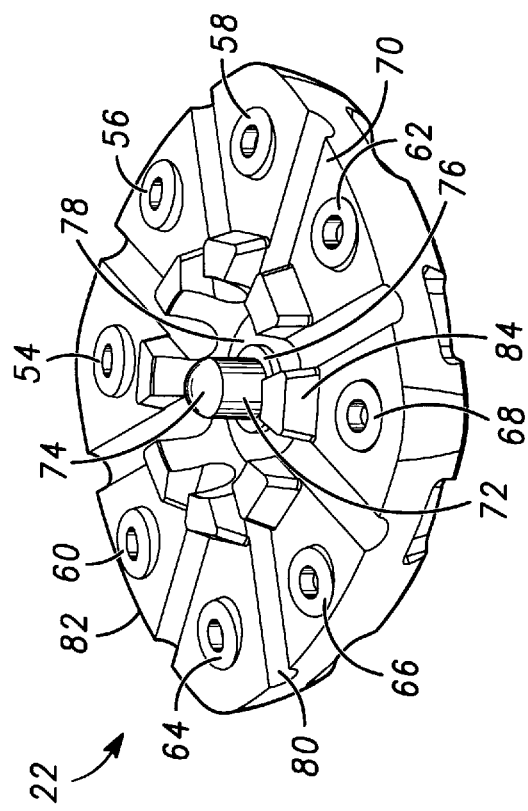
FIG. 4 is a bottom perspective view of the button member of FIG. 2.
Figure 3:
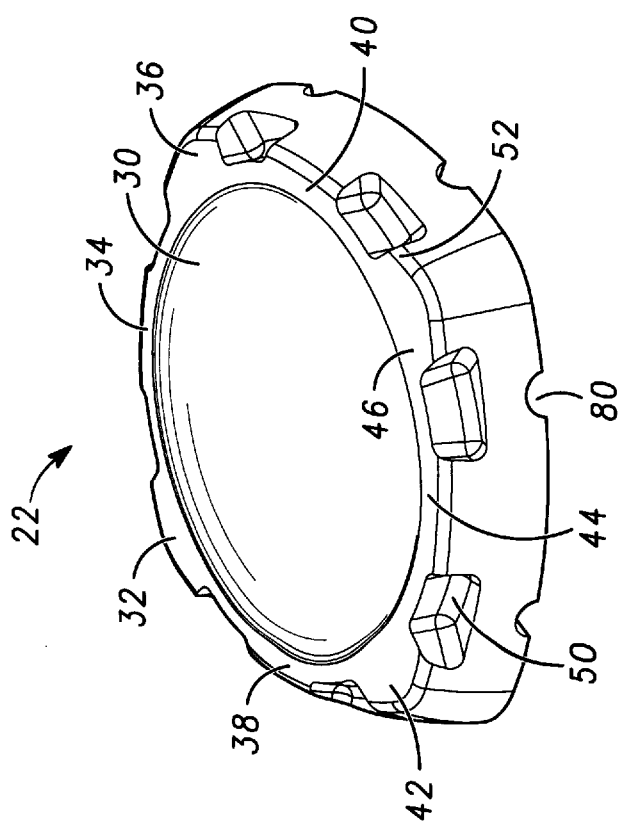
FIG. 3 is a top perspective view of the button member of the key assembly of FIG. 2 shown in an exemplary numeric key arrangement.

With reference to FIG. 2, the multi-function key assembly 12 includes a button member 22 and a base member 24 that supports the button member 22 over a popple dome switch array 26 associated with a PC circuit board substrate 28 in a manner described in detail below. With continued reference to FIG. 2 and particular reference to FIGS. 3 and 4, the button member 22 includes an upper contoured surface 30 defining a plurality of key regions 32–48.

A central key region 48 forms a concave central depression. The central key region 48 is surrounded by the plurality of perimeter key regions 32–46 formed as rises or crests between a plurality of indents 50 provided about a top peripheral edge 52. It is contemplated that the upper surface 30 can be of many various designs including, without limitation, alternate contours, shapes, etc.

In the preferred embodiment, the key regions 32–48 are arranged in a manner consistent with the one through nine keys of a conventional telephone keypad. The central key region 48 represents the five key of a telephone keypad and each perimeter key region 32–46 represents the remaining keys (key region 32 is the one key, key region 34 is the two key, etc.). However, it should be appreciated that each key region 32–48 may represent any function or even multiple functions.

The button member 22 includes a plurality of peripheral plungers 54–68 extending from a lower surface 70. Each of the plungers 54–68 of the lower surface 70 corresponds directly to the perimeter key region 32–46 located directly opposite that specific plunger 54–68 on the upper surface 30. For example, peripheral plunger 64 is positioned directly opposite the one key region 32, therefore, peripheral plunger 64 corresponds to the one key region 32. Similarly, peripheral plunger 66 is positioned directly opposite the two key region 34, therefore, peripheral plunger 66 corresponds to the two key region 34. In a like manner, peripheral plungers 54–62, 68 also correspond to respective key regions 36–46.

Each peripheral plunger 54–68 extends annularly from the lower surface 70 of the button member 22 and angles outwardly from the center of the button member 22. A central plunger 72 is provided at or near the center of the lower surface 70 of the button member 22 and extends a greater distance from the lower surface 70 than the peripheral plungers 54–68. The central plunger 72 is positioned directly opposite of and, therefore, corresponds to central key region 48. The central plunger 72 includes a rounded tip 74 and a base portion 76. Surrounding the base portion 76 is a depressed central area 78.

The lower surface 70 additionally includes a plurality of radially extending grooves 80 disposed between each of the peripheral plungers 54–68 and extending from the depressed central area 78 radially outwardly to the bottom peripheral edge 82. A plurality of raised stops 84 extend from the lower surface 70 of the button member 22 and each is disposed between a pair of grooves 80. The raised stops 84 extend a distance less than that of the central plunger 72 but more than the distance of the peripheral plungers 54–68. The raised stops 84 are radially located between the central plunger 72 and the peripheral plungers 54–68 and taper downward toward the lower surface 70 along their radial lengths.

Figure 6:
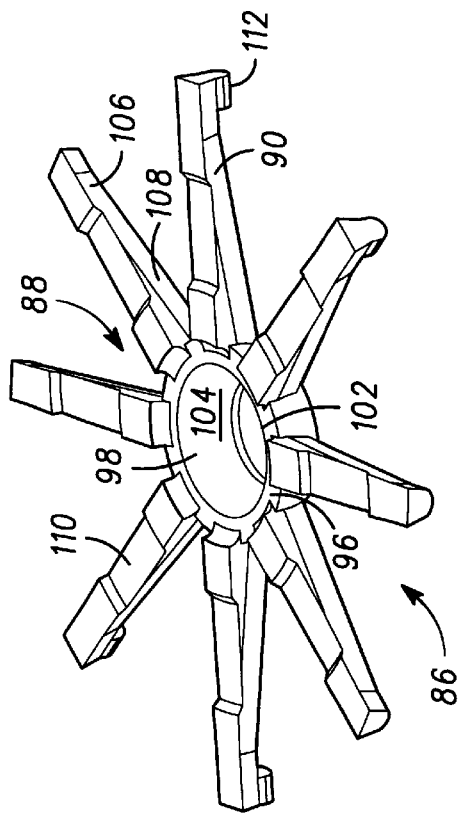
FIG. 6 is a bottom perspective view of a base member of FIG. 5.
Figure 5:
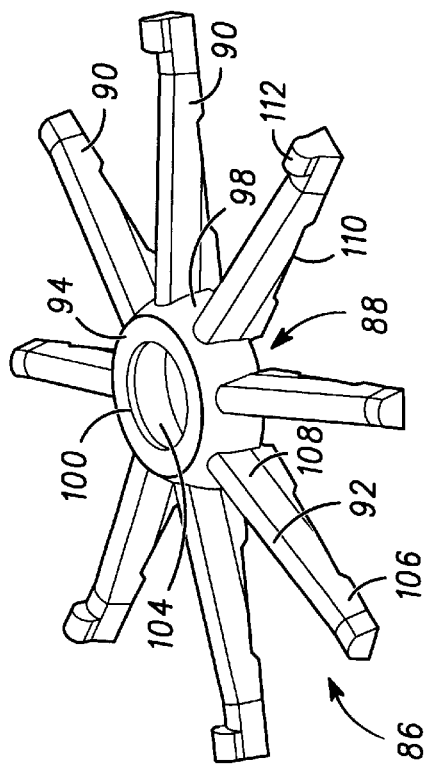
FIG. 5 is a top perspective view of a base member of the key assembly of FIG. 1.

With reference to FIGS. 5 and 6, the base member 86 includes a hub 88 and a plurality of legs 90 extending radially outwardly from the hub 88. The legs 90 each have a rounded top portion 92 that is capable of being received in the grooves 80 of the button member 22. The hub 88 has an upper surface 94 and a lower surface 96 with a hub body 98 disposed therebetween. The upper surface 94 includes an upper opening 100 and the lower surface 96 includes a lower opening 102 with a hub cavity 104 disposed therebetween. The diameter of the upper opening 100 is smaller than the diameter of the lower opening 102. The inner side of the hub body 98 is generally rounded and tapered between the upper opening 100 and the lower opening 102. The inner side of the hub body 98, the upper opening 100 and the lower opening 102 combine to substantially define the hub cavity 104.

Additionally, the legs 90 are tapered along their radial lengths such that the height dimension of the leg distal ends 106 is smaller than the height dimension of the opposite leg ends 108. Of particular importance, the lower surface 96 of the hub 88 is offset relative to the bottom of the legs 90 such that when the base member 86 is abutted against a flat surface only the legs 90 are in contact with the flat surface, not the lower surface 96. The offset provides a clearance area below the hub 88 as will be discussed below. Likewise, the legs 90 include lower indentations 110 which also provide clearance beneath each leg 90 and any surface abutted against the bottom of the base member 86. The legs 90 of the base 86 are also capable of engaging the raised stops 84 of the button member 22.

The legs 90 of the base member 86 also include upward extending positioning members 112 located at or near the distal ends 106 of the legs 90. The upward extending positioning members 112 are capable of positioning the button assembly 12 relative to the housing 2 and providing a means for mounting the multi-function key assembly 12 to the housing 2.

Figure 8:
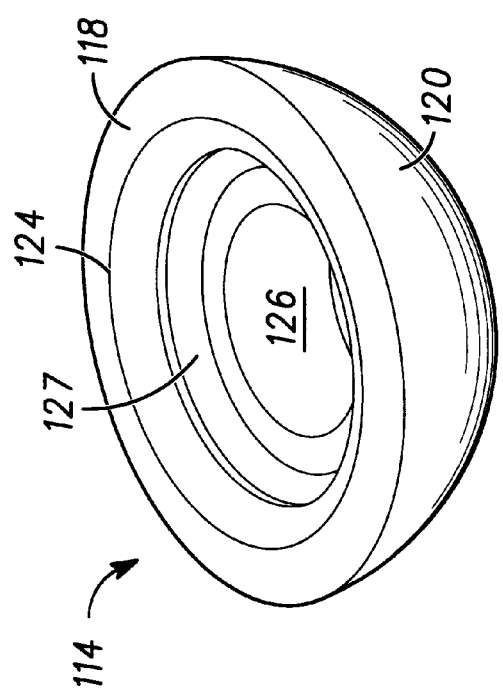
FIG. 8 is a bottom perspective view of the pivot member of FIG. 7.
Figure 7:
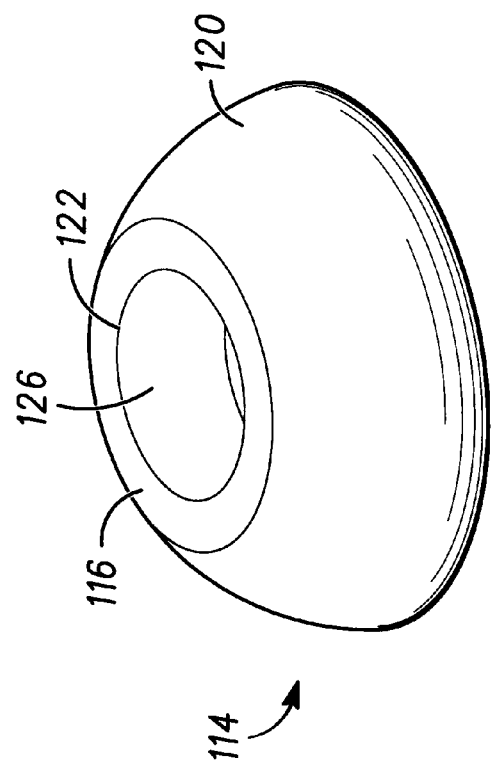
FIG. 7 is a top perspective view of a pivot member of the key assembly of FIG. 1.

With reference to FIGS. 7 and 8, the multi-function key assembly 12 further includes a pivot 114 for operatively securing the button member 22 to the base member 86. The pivot 114 is capable of being received within the cavity 104 of the base hub 88. The pivot 114 includes an upper surface 116 and a lower surface 118. The outer diameter of the upper surface 116 is smaller than the outer diameter of the lower surface 118. Connected between the upper and lower surfaces 116 and 118 is a wall 120 having a generally tapered and rounded shape. The shape of the wall 120 is such that the pivot 114 is capable of being snugly received within the cavity 104 of the hub 88. The upper surface 116 includes an upper opening 122 and the lower surface 118 includes a lower opening 124. A central pivot cavity 126 is defined therebetween and disposed within the wall 120. A relieved area 127 is disposed on an interior wall defining the central pivot cavity 126.

Figure 10:
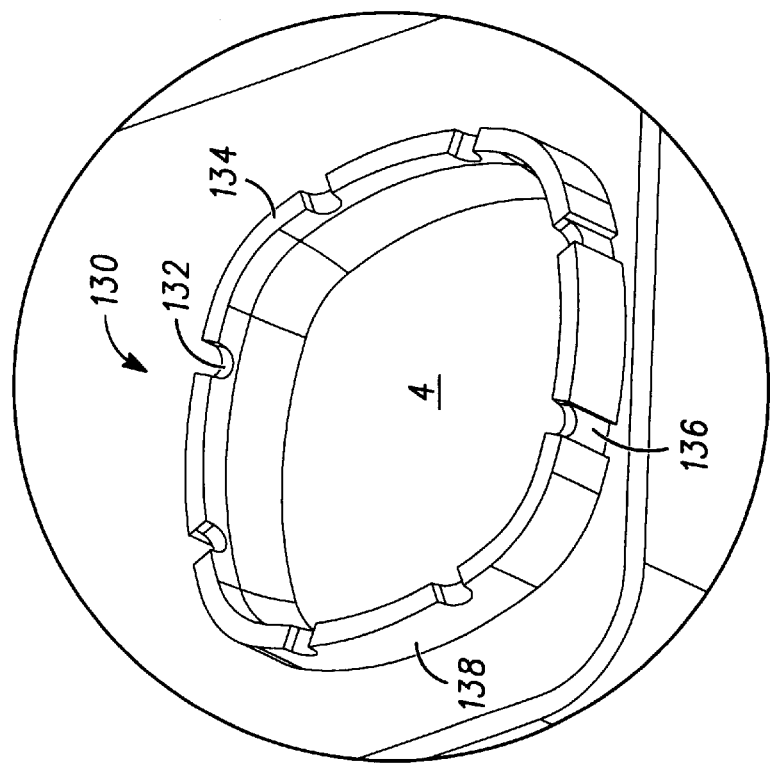
FIG. 10 is an enlarged view of the supporting member of FIG. 9.
Figure 9:
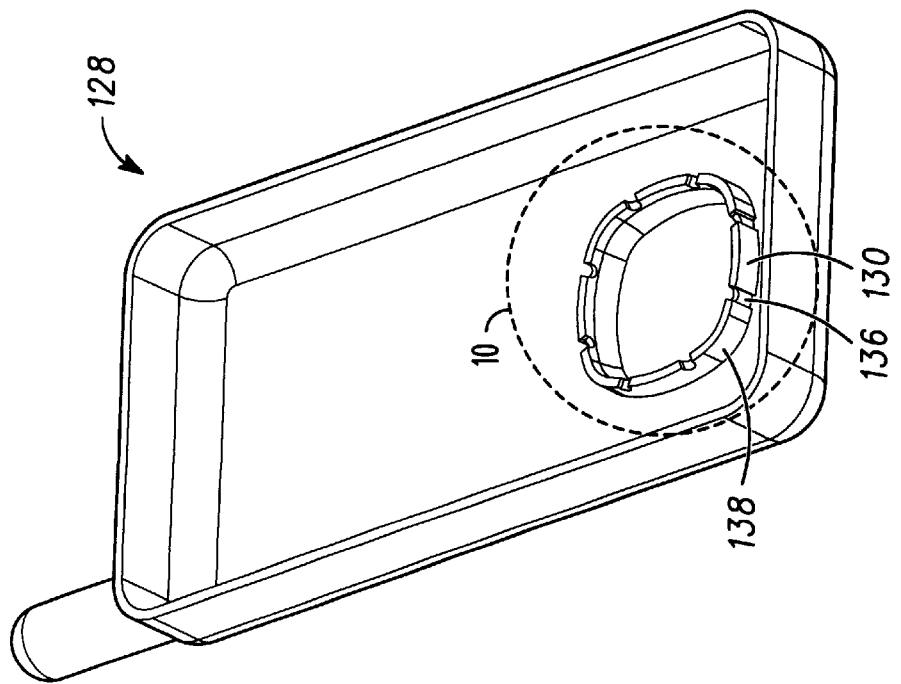
FIG. 9 is a perspective view of a front housing piece having a supporting member in accordance with the present invention.
Figure 11:
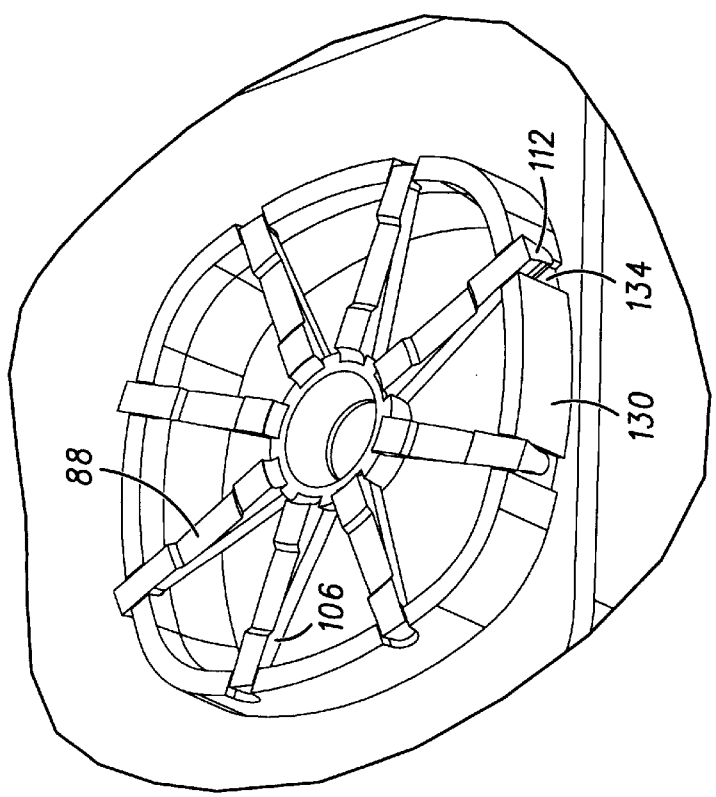
FIG. 11 is an enlarged view of the base member engaged with the supporting member of FIG. 9.

With reference to FIGS. 9–11, the housing 2 comprises a front housing piece 128 having a supporting member 130 disposed thereon and located around the opening 4. More specifically, the supporting member 130 extends into a cavity defined by the front housing piece 128 and a rear housing piece (not shown). The supporting member 130 comprises a plurality of notched recesses 132 located on a bottom edge 134 of the supporting member 130. The notched recesses 132 are adapted to receive the distal ends 106 of the base legs 90.

Additionally, the supporting member 130 includes a plurality of keyed recesses 136 disposed on the peripheral side 138 of the supporting member 130 at the location of some of the plurality of notched recesses 132. The keyed recesses 136 extend from the bottom edge 134 of the supporting member 130 to the interior wall of the front housing piece 128. The keyed recesses 136 are each capable of receiving one upward extending positioning member 112 of the base member 86. As best shown in FIG. 11, the base member 86 is maintained in a generally static position relative to the front housing piece 128. More specifically, the respective engagements between the positioning members 112 of the base member 86 and the keyed recesses 136 of the supporting member 130 prevent the base member 86 from rotating or moving laterally.

Figure 12:
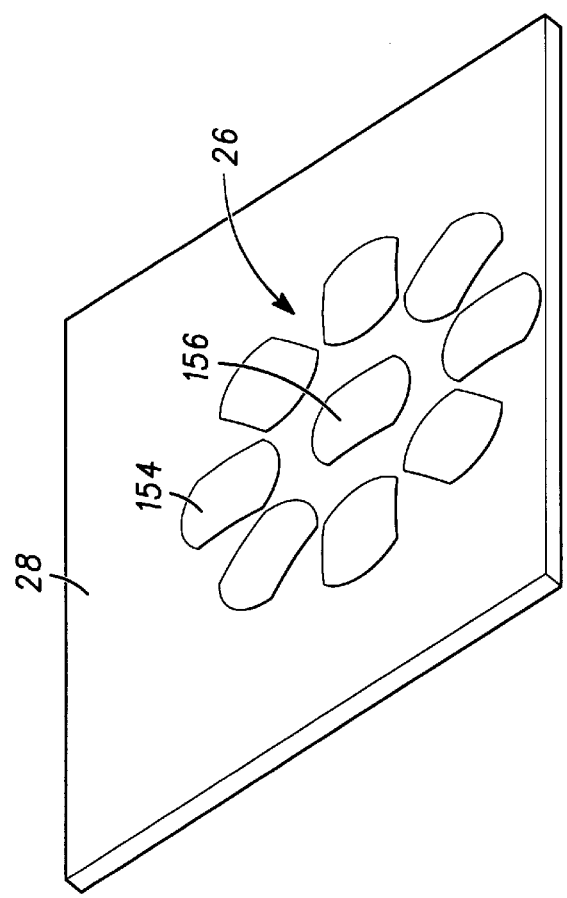
FIG. 12 is a top perspective view of a substrate having a popple dome switch array in accordance with the present invention.

With reference to FIG. 12, the PC circuit board or substrate 28 has a popple dome switch array 26. The popple dome switch array 26 comprises a plurality of peripheral popple domes 154 and a central popple dome 156. Although not illustrated, the domes 154 and 156 are typically assembled to a mylar backing as is well known in the art. The substrate 28 is capable of securing the base member 86 to the supporting member 130.

Figure 13:
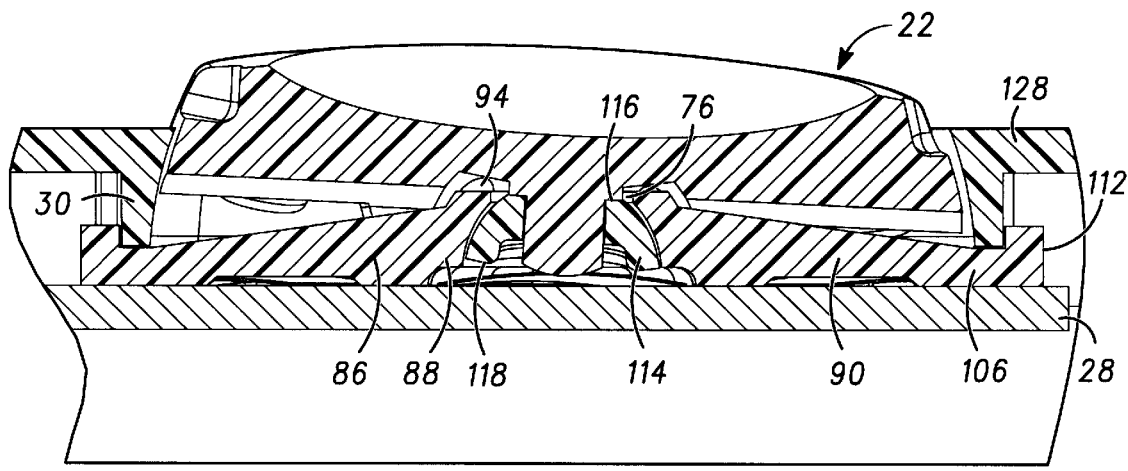
FIG. 13 is a cross-sectional view of a multi-function key assembly taken along line 13—13 of FIG. 2 showing the multi-function key assembly and the base held in position between a housing and a substrate.

With reference to FIG. 13, the multi-function key assembly 12 is shown sandwiched between the front housing piece 128 and the substrate 28. To assemble, the pivot 114 is operatively received within the cavity 104 of the base hub 88 and in abutting contact to the depressed central area 78 of the button member 22 along its upper surface 116 with the base member 86 positioned therebetween. The outside diameter of the pivot lower surface 118 is larger than the inside diameter of the hub upper surface 94 and, thus, the pivot 114 is incapable of passing through the hub 88. Securing the button member 22 to the pivot 114, the central plunger 72 is rigidly attached to the relieved area 127.

The rigid attachment of the pivot 114 to the button member 22 may be of any known means including without limitation heat–staking, ultrasonic welding, and press-fitting. The pivot 114 acts as a bearing surface during operation of the multi-function button assembly 12. As a result, the pivot 114 is preferably made of a smooth, hard material to minimize friction between the pivot 114 and hub 88 of the base member 86 and is capable of surviving the wear of extended life.

The sub-assembly of the button member 22, base member 86 and the pivot 114 is then placed in the front housing piece 128. The distal ends 106 of legs 90 are received within the notched recesses 132 of the supporting member 130 and the positioning members 112 are additionally received in the keyed recesses 134 of the supporting member 130. In this arrangement, the button member 22 protrudes through the front housing piece 128.

Lastly, the substrate 28 is placed in abutting contact with the base member 86. The substrate 28 prevents the base member 86 from disengaging the supporting member 130, i.e., the sub–assembly is sandwiched between the front housing piece 128 and the substrate 28. The substrate 28 is secured to the front housing piece 128 through any known means as is well known in the art. For example, the rear housing piece could have screws or embossments for supporting the substrate 28 against the front housing piece 128. Obviously, other configurations of supporting the sub-assembly to the housing 2 are possible and are to be considered within the scope of the present invention.

When the substrate 28 is secured to the front housing piece 128, the substrate 28 is in abutting contact with legs 90 of the base member 86 and secures the base member 86 to the housing 2. The popple dome switch array 26 is positioned on the substrate 28 such that each peripheral popple dome switch 154 is vertically aligned with the peripheral plungers 54–68 of the button member 22 and, likewise, the central plunger 72 is vertically aligned with the central popple dome switch 156. The legs 90 are positioned between peripheral popple dome switches 154. The lower indentations 110 on the legs 90 provide clearance between the peripheral edges of the peripheral popple dome switches 154 and the legs 90. The raised hub 88 provides clearance between the base member 86 and the central popple switch 156.

In the assembled configuration, the button member 22 is prevented from rotating relative to the base member 86. More specifically, the raised stops 84 of the button member 22 are radially aligned with the peripheral plungers 54–68. The button member 22 is incapable of rotating because the legs 90 impede the rotation of the raised stops 84.

Additionally, the legs 90 of the base member 86 are partially received in the grooves 80 of the button member 22 when the button member 22 is at rest. The fit between the base legs 90 and the grooves 80 of the button member 22 assists the raised stops 84 in preventing general rotation of the button member 22. Rather then being able to rotate, the grooves 80 and the raised stops 84 of button member 22 engage the legs 90 and maintain the button in a relatively static radial position.

In an alternate embodiment of the present invention, the base member 86 may be mounted directly to the housing 2. In such a configuration, the substrate 28 is no longer required to maintain the vertical position of the sub–assembly of the pivot 114, the base 90 and the button member 22. Alternatively, the base member 86 could be mounted directly to the substrate 28. Of course, additional mounting arrangements or assembly configurations are contemplated and are considered within the scope of this invention.

The multi-function key assembly 12 is capable of being pressed in the direction of any of the key regions 32–48. Each key region 32–48 corresponds to a specific plunger 54–68, 72 and each plunger 54–68, 72 corresponds to a specific popple dome switch 154–156. Thus, the depression of a key region 32–48 will cause the closure and activation on a specific popple dome switch 154–156. Also, every groove 80 and leg 90 of the base member 86 correlates to a pair of adjacent peripheral plungers 54–68 and, likewise, each peripheral plunger 54–68 is radially aligned to a specific raised stop 84.

Figure 14:
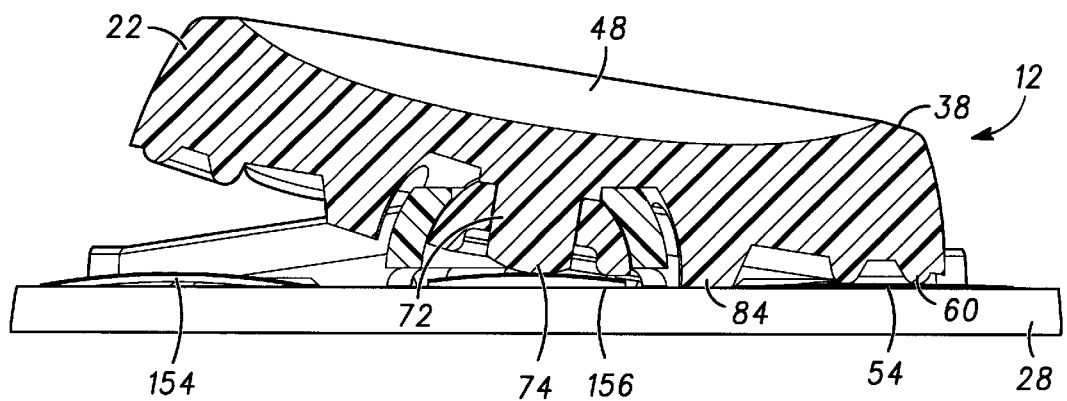
FIG. 14 is a cross-sectional view of the multi-function key assembly taken along line 14—14 of FIG. 2 with the housing and positioning members removed showing the depression of the four key region of the button member.
Figure 15:
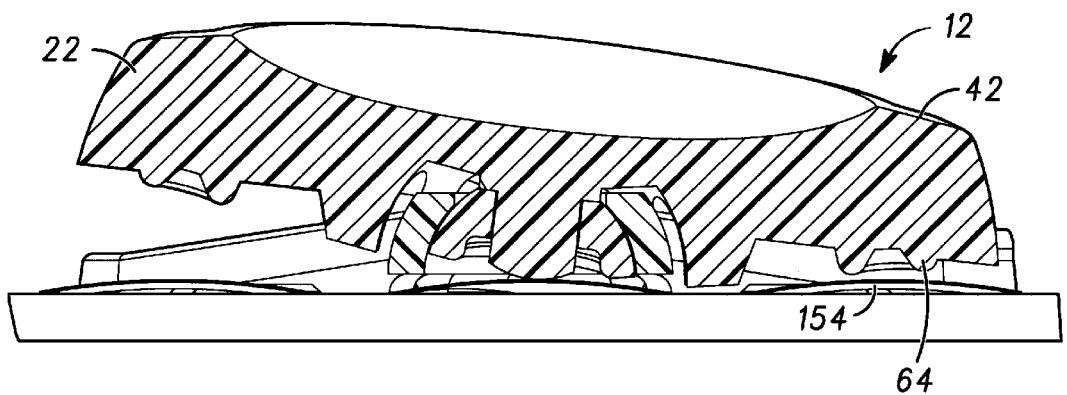
FIG. 15 is a cross-sectional view of the multi-function key assembly taken along line 15—15 of FIG. 2 with the housing and positioning members removed showing the depression of the four key region of the button member.
Figure 16:
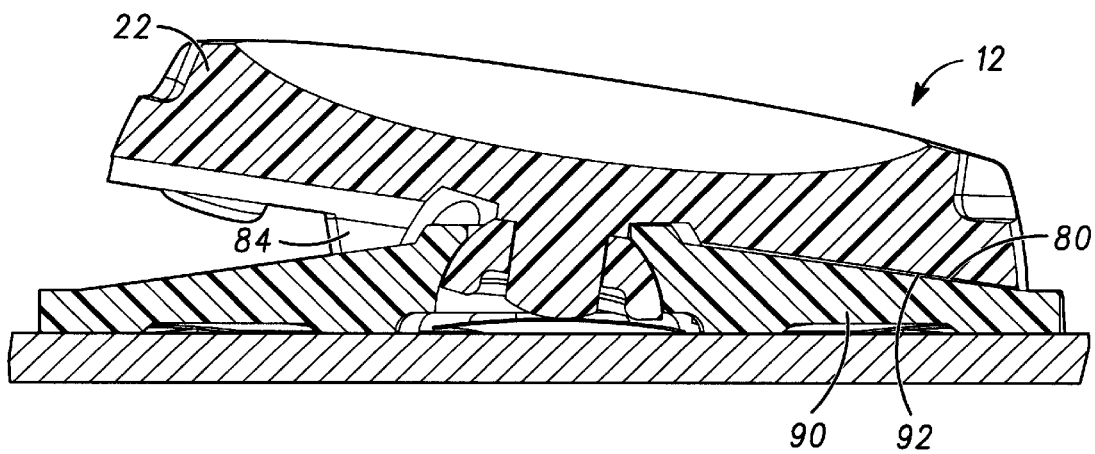
FIG. 16 is a cross-sectional view of the multi-function key assembly taken along line 16—16 of FIG. 2 with the housing and positioning members removed showing the depression of the four key region of the button member.

With reference to FIGS. 14, 15, and 16, the multi-function key assembly 12 is shown with the four key region 38 depressed. Specifically in FIG. 14, the button member 22 is shown rotated about the rounded tip 74 of the central plunger 72 in the direction of the four key region 38. The peripheral plunger 60 corresponding to the four key region 38 forces its corresponding popple dome switch 154 downward toward the substrate 28. The tip 74 pivots on the central dome switch 156 without forcing the central dome switch 156 downward toward the substrate 28. The central dome switch 156 requires a higher force to be depressed than the perimeter popple domes 154 so as to prevent accidental depressions of the five key region 48 when the user intends to pivot the button member 22 in the direction of one of the perimeter key regions 32–46. The raised stop 84 corresponding to the peripheral plunger 60 of the four key region 38 is resting against the substrate 28 and prevents the button member 22 from pivoting any further.

With specific reference to FIG. 15, the peripheral plunger 54 corresponding to the seven key region 42 does not contact the popple dome switch 154 of the seven key region 42 when the four key region 38 is fully depressed. Now with specific reference to FIG. 16, the groove 80 disposed between the peripheral plunger 60 of the four key region 38 and the peripheral plunger 54 of the seven key region 42 is fully engaged by the corresponding rounded portion 92 of the leg 90. Thus, the button member 22 is prevented from pivoting toward any other perimeter key 32–36 and 40–46 until the four key region 38 is released.

Figure 17:
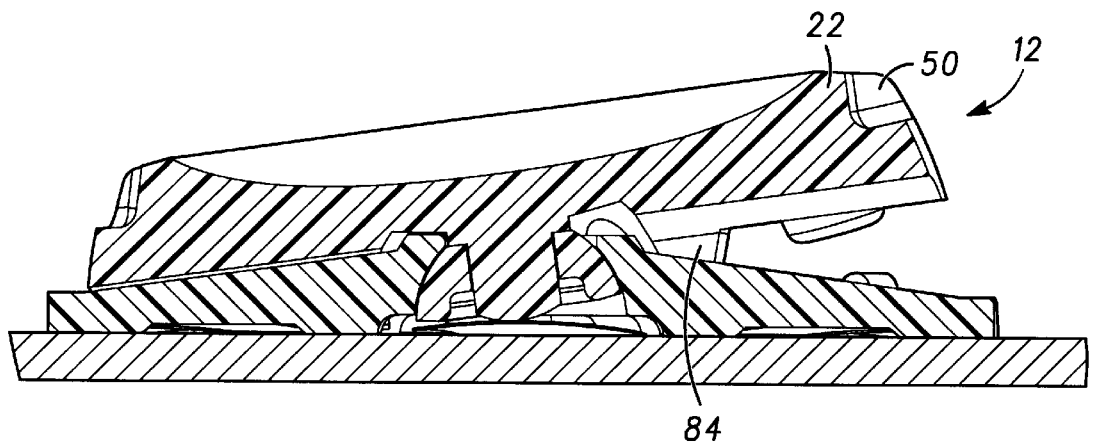
FIG. 17 is a cross-sectional view of the multi-function key assembly taken along line 17—17 of FIG. 2 with the housing and positioning members removed showing the simultaneous depression of the six key region and the three key region of the button member.
Figure 18:
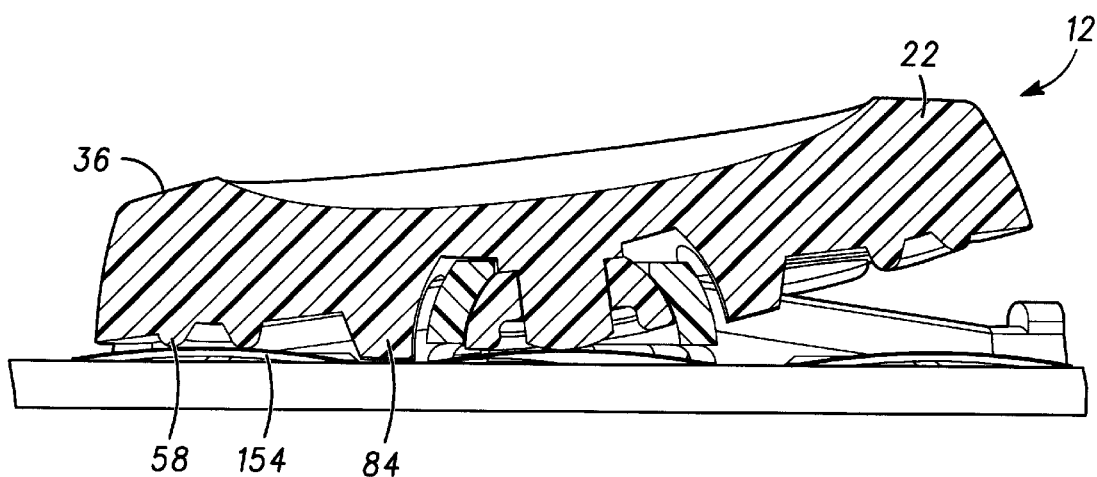
FIG. 18 is a cross-sectional view of the multi-function key assembly taken along line 18—18 of FIG. 2 with the housing and positioning members removed showing the simultaneous depression of the six key region and the three key region of the button member.

With reference to FIGS. 17 and 18, the multi–function key assembly 12 is shown with the button member 22 pressed between the three key region 36 and the six key region 40 in the direction of the indentation 50 therebetween. With specific reference to FIG. 18, the peripheral plunger 68 of the three key region 36 is prevented from contacting the popple dome switch 154 corresponding to the three key region 36 by the raised stop 84. Although not shown, the peripheral plunger 62 of the six key region 40 is also prevented from contacting the popple dome switch 154 corresponding to the six key region 40 in a similar manner. These peripheral plungers 68 and 62 are the closest peripheral plungers 54–68 to any peripheral popple dome switch 154. Thus, two or more perimeter key regions 32–46 cannot be actuated simultaneously.

Figure 19:
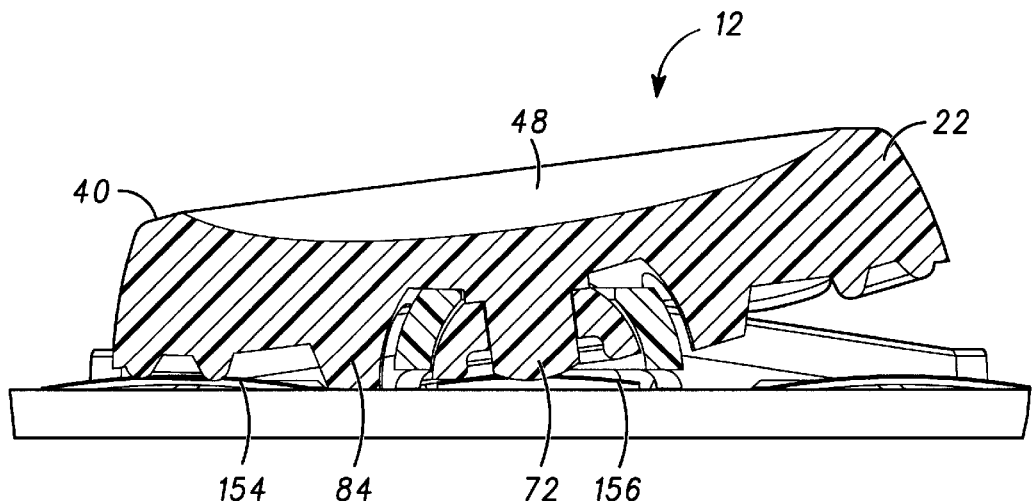
FIG. 19 is a cross-sectional view of the multi-function key assembly taken along line 19—19 of FIG. 2 with the housing and positioning members removed showing the simultaneous depression of the five key region and the six key region of the button member.

With reference to FIG. 19, the multi-function key assembly 12 is shown with the button member 22 pressed between the five key region 48 and the six key region 40. Stop 84 prevents both the peripheral plunger 62 of the six key region 40 and the central plunger 72 of the five key region 48 from depressing their respective popple switches 154 and 156. Thus, the five key region 48 and any peripheral key region 32–46 cannot be actuated simultaneously.

Figure 20:
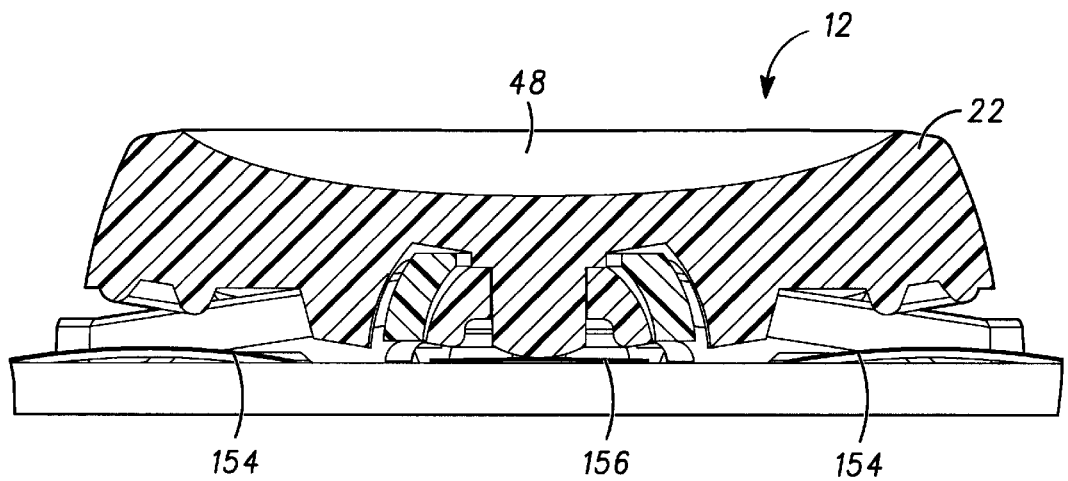
FIG. 20 is a cross-sectional view of the multi-function key assembly taken along line 20—20 of FIG. 2 with the housing and positioning members removed showing the depression of the five key region of the button member.

With reference to FIG. 20, the five key region 48 is shown fully depressed directly downward toward the substrate 28. In this position, the central plunger 72 depresses the central popple 156 without depressing any of the peripheral popples 154.

A spring (not shown) is provided in the preferred embodiment around the central plunger 72 and between the pivot 114 and the substrate 28. The spring is vertically biased and maintains the button member 22 in a straight and upright position. Additionally, the spring provides some minimal resistance against which the user must pivot the button member 22. This minimal resistance serves to provide consistent tactile feedback to a user when depressing any key region 32–48. In addition, the resistance of the spring eliminates any possible loose fits within the multi-function key assembly 12.

In operation, a user places his or her thumb in the five key region 48. From the five key region 48, the user can determine the general location of the remaining key regions 32–46 by simply knowing the layout of a standard nine key telephone keypad. The indentations 50 assist the user in finding a desired key region 32–46 by providing tactile feedback, however, other means of providing tactile feedback may be used.

Once a desired key region 32–46 is located, the user may activate that desired key region 32–46 by pushing the button member 22 in the direction of that key region 32–46. If the user desires to activate the five key region 48, the entire button member 22 is pushed directly downward. Pressing any key region 32–48 causes the plunger 54–68, 72 associated with that key region 32–48 to close the popple switch 154, 156 associated with that plunger 54–68, 72. Closing of the popple switch 154, 156 sends a signal to the electronic device as is well known.

The multi-function key assembly 12 has been described in reference to a nine key numeric keypad, but it should be appreciated that the key assembly 12 may include additional or alternative functions as well. For example, the key assembly 12 may operate like a computer mouse by moving a cursor around a display screen. Each key region 32–48 would then serve as a direction indicator with the five key 48 serving as a "mouse click" or selection function upon depression. The key assembly 12 may have multiple modes in a single application. For example, the key assembly 12 may serve as a nine digit numeric keypad in combination with a computer mouse. In a similar fashion, each key region 32–48 may serve multiple functions. For example, the five key region 48 may operate as a conventional zero key upon a double-click.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A data entry device for an apparatus, the data entry device including:
   a plurality of switches;
   a movable button member spaced apart from the plurality of switches, the button member including a first contoured surface and a second contoured surface, the first contoured surface defining a plurality of key regions and the second contoured surface defining a plurality of plungers, each of the plurality of plungers adapted to contact and actuate a corresponding one of the plurality of switches when a corresponding one of the plurality of key regions is depressed; and
   a base for supporting the button member at a predetermined distance away from the plurality of switches, the base including a central hub and a plurality of legs extending radially from the hub;
   wherein the second contoured surface includes a plurality of radially-extending grooves that interface with the corresponding plurality of legs to prevent the button member from simultaneously actuating more than one of the plurality of switches, and prevent the button member from rotating relative to the base.

2. The data entry device of claim 1, wherein the apparatus includes a housing, and at least one of the plurality of legs is secured to the housing.

3. The data entry device of claim 1, further including a retaining member that pivotally seats in the central hub and secures the button member to the base, the button member adapted to pivotally engage at least one of the plurality of switches and axially engage at least another one of the plurality of switches.

4. The data entry device of claim 1, further including a retaining member that pivotally seats in the central hub and secures the button member to the base, and a biasing element that facilitates locating the button member in an upright neutral position relative to the base.

5. A wireless subscriber device comprising:
   a housing with an aperture therethrough;
   a data input assembly including a plurality of switches, and a movable button member spaced apart from the plurality of switches, the button member including a first contoured surface and a second contoured surface, the first contoured surface projecting through the aperture and defining a plurality of key regions, the second contoured surface defining a plurality of plungers, each of the plurality of plungers adapted to contact and actuate a corresponding one of the plurality of switches when a corresponding one of the plurality of key regions is depressed; and
   a base having a central hub and a plurality of legs extending radially from the hub, at least one of the plurality of legs being secured to the housing to support the button member at a predetermined clearance from the plurality of switches;
   wherein the second contoured surface includes a plurality of radially-extending grooves that interface with the corresponding plurality of legs, and includes a plurality of raised stops, the grooves adapted to prevent the button member from simultaneously actuating more than one of the plurality of switches, and prevent the button member from rotating relative to the base.

6. The wireless subscriber device of claim 5, further including a retaining member that pivotally seats in the central hub and secures the button member to the base, the button member adapted to pivotally engage at least one of the plurality of switches and axially engage at least another one of the plurality of switches.

7. The wireless subscriber device of claim 5, further including a retaining member that pivotally seats in the central hub and secures the button member to the base, and a biasing element that facilitates locating the button member in an upright neutral position relative to the base.

* * * * *